United States Patent
Liu et al.

(10) Patent No.: US 10,509,499 B2
(45) Date of Patent: Dec. 17, 2019

(54) TFT SUBSTRATE AND TOUCH DISPLAY PANEL USING SAME

(71) Applicant: HON HAI PRECISION INDUSTRY CO., LTD., New Taipei (TW)

(72) Inventors: Chia-Lin Liu, New Taipei (TW); Yu-Fu Weng, New Taipei (TW); Chien-Wen Lin, New Taipei (TW); Tzu-Yu Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 15/802,856

(22) Filed: Nov. 3, 2017

(65) Prior Publication Data

US 2018/0129329 A1    May 10, 2018

Related U.S. Application Data

(60) Provisional application No. 62/419,463, filed on Nov. 8, 2016.

(51) Int. Cl.
| | |
|---|---|
| *G06F 3/041* | (2006.01) |
| *G02F 1/1333* | (2006.01) |
| *G02F 1/1335* | (2006.01) |
| *G06F 3/044* | (2006.01) |
| *G02F 1/1343* | (2006.01) |

(52) U.S. Cl.
CPC .......... *G06F 3/0412* (2013.01); *G02F 1/1343* (2013.01); *G02F 1/133514* (2013.01); *G06F 3/044* (2013.01); *G02F 1/13338* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2013/0147724 A1* | 6/2013 | Hwang | G06F 3/0412 345/173 |
| 2014/0132534 A1 | 5/2014 | Kim | |
| 2014/0184559 A1* | 7/2014 | Han | G06F 3/0412 345/174 |
| 2015/0084912 A1* | 3/2015 | Seo | G06F 3/0412 345/174 |

FOREIGN PATENT DOCUMENTS

| | | |
|---|---|---|
| CN | 103809316 A | 5/2014 |
| CN | 103902120 A | 7/2014 |

* cited by examiner

*Primary Examiner* — Benjamin C Lee
*Assistant Examiner* — Krishna P Neupane
(74) *Attorney, Agent, or Firm* — ScienBiziP, P.C.

(57) ABSTRACT

A TFT substrate defines a display area and a non-display area surrounding the display area. The TFT substrate includes a substrate and a conductive layer on the substrate. The conductive layer includes a plurality of touch driving electrodes, a plurality of touch sensing electrodes, and a plurality of common electrodes. The touch sensing electrodes are arranged in rows along a first direction and in columns along a second direction. Each touch driving electrode and each common electrode extend as strips along the first direction, the touch driving electrodes and the common electrodes are arranged in one column along the second direction. One common electrode and one row of the touch sensing electrodes are arranged at each side of each touch driving electrode along the second direction. The TFT substrate further includes a plurality of sensing lines.

16 Claims, 5 Drawing Sheets

TFT SUBSTRATE AND TOUCH DISPLAY PANEL USING SAME

FIELD

The subject matter herein generally relates to a thin film transistor (TFT) substrate and a touch display panel using the TFT substrate.

BACKGROUND

A touch display panel can include touch sensing structures. A conventional mutual capacitive touch display panel may include a plurality of touch driving electrodes and a plurality of touch sensing electrodes. However, the touch driving electrodes and the touch sensing electrodes are usually located on different layers, which is not conducive to reduce an overall thickness of the touch display panel. Therefore, there is room for improvement in the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

First Embodiment

Figure 1:
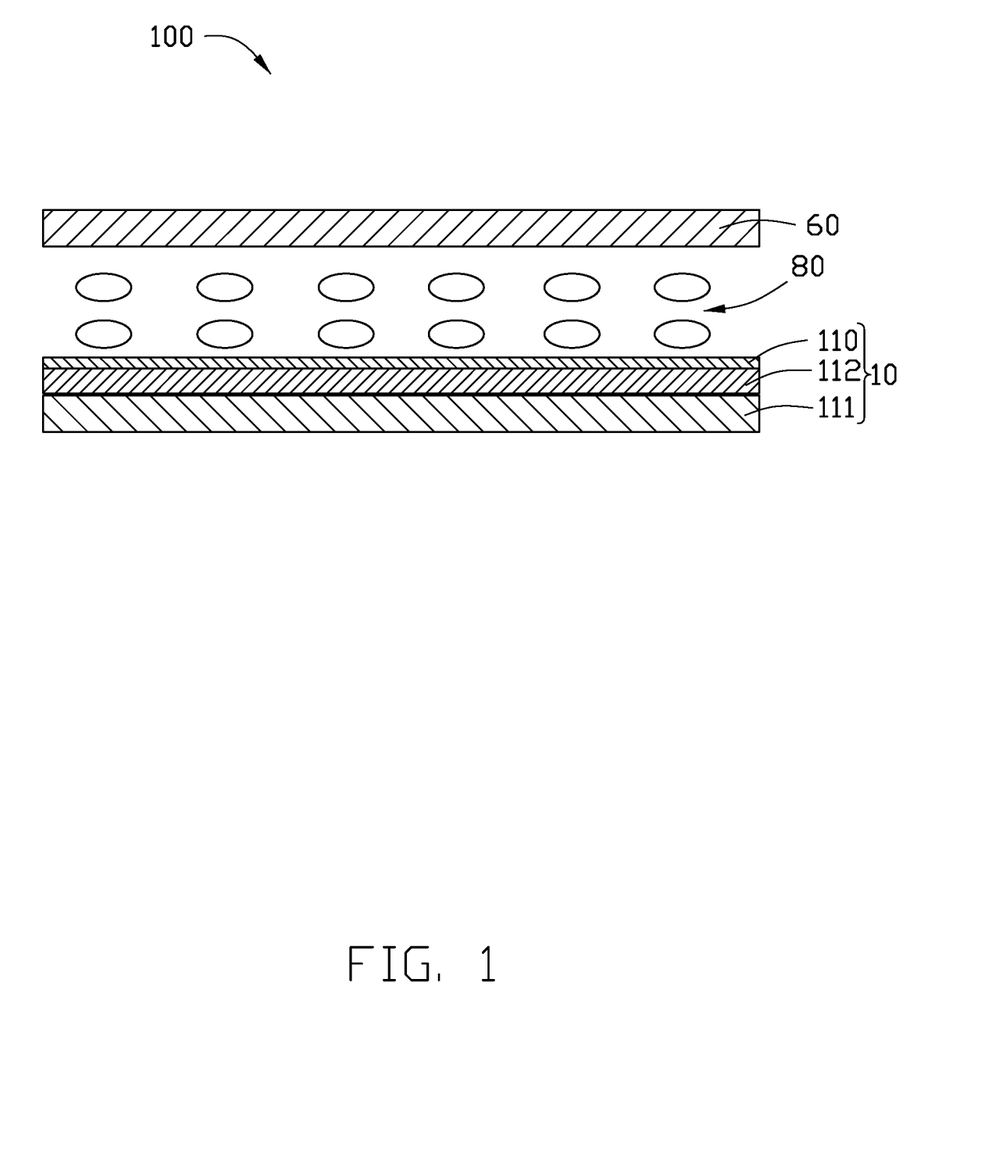
FIG. 1 is a cross sectional view of an exemplary embodiment of a touch display panel.

Referring to FIG. 1, an exemplary embodiment of a touch display panel 100 is illustrated. In the exemplary embodiment, the touch display panel 100 is an in-cell touch display panel. The touch display panel 100 includes a TFT substrate 10, a color filter substrate 60 facing the TFT substrate 10, a liquid crystal layer 80 between the TFT substrate 10 and the color filter substrate 60, and a plurality of conventional photo spacers (not shown) for supporting a gap between the TFT substrate 10 and the color filter substrate 60.

The TFT substrate 10 includes a base substrate 111 and a conductive material layer 110 formed on a surface of the base substrate 111 facing the color filter substrate 60. The TFT substrate 10 further includes an intermediate layer 112 between the base substrate 111 and the conductive material layer 110. The intermediate layer 112 may be a multi-layer structure, which may form a variety of known features, such as, but not limited to, a plurality of thin film transistors (not shown), at least one insulating coating layer (not shown) covers the thin film transistors, a plurality of pixel electrodes (not shown), a plurality of scanning lines (not shown), and a plurality of data lines (not shown).

The base substrate 111 is used to carry the elements of the TFT substrate 10. The base substrate 111 may be made of a transparent material, for example, transparent glass, transparent plastic, or the like. The conductive material layer 110 may form common electrodes for display and touch electrodes for detecting touch events and touch positions.

Figure 2:
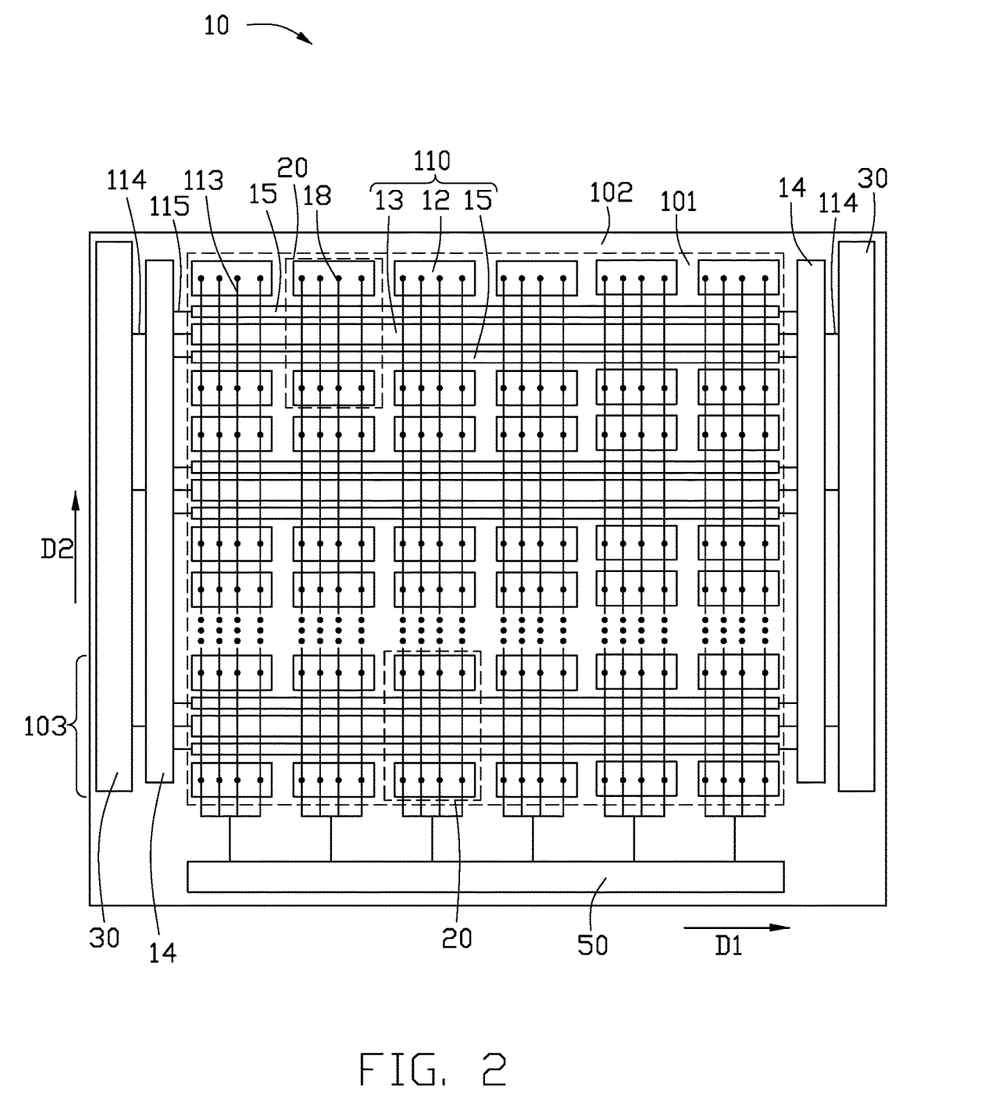
FIG. 2 is a planar view of a first exemplary embodiment of a TFT substrate in the touch display panel of FIG. 1.

The TFT substrate 10 defines a display area 101 and a non-display area 102 surrounding the display area 101 as shown in FIG. 2. The conductive material layer 110 forms a plurality of touch sensing electrodes 12 spaced apart from each other, a plurality of touch driving electrodes 13 spaced apart from each other, and a plurality of common electrodes 15 spaced apart from each other. The touch driving electrodes 13, the touch sensing electrodes 12, and the common electrodes 15 are in the display area 101. The conductive material layer 110 may be made of a conventional transparent conductive material in the art, such as indium tin oxide. The common electrodes 15 and pixel electrodes (not shown) cooperatively form an electrical field (not shown) to rotate liquid crystal molecules of the liquid crystal layer 80, as known in the art. The touch driving electrodes 13 cooperate with the touch sensing electrodes 12 to detect touch events and touch positions.

As shown in FIG. 2, each touch sensing electrode 12 is substantially rectangular. The plurality of touch sensing electrodes 12 are arranged in a plurality of rows along a first direction (D1 in FIG. 2) and in a plurality of columns along a second direction (D2 in FIG. 2). The first direction intersects the second direction. In the present exemplary embodiment, the first direction is substantially perpendicular to the second direction. FIG. 2 shows that each row of the touch sensing electrodes 12 including six touch sensing electrodes 12. The number of the touch sensing electrodes 12 in each row is not limited to six, and can be more or less than six. Each touch driving electrode 13 and each common electrode 15 extend as strips along the first direction, and all of the touch driving electrodes 13 and the common electrodes 15 are arranged in one column along the second direction. In the present exemplary embodiment, each touch driving electrode 13 has a length along the first direction that is substantially equal to a length of each common electrode 15 along the first direction. Each touch driving electrode 13 aligns with each common electrode 15 and each row of the touch sensing electrodes 12. In the present exemplary embodiment, a width of each touch driving electrode 13 along the second direction is greater than a width of each common electrode 15 along the second direction. In the present exemplary embodiment, the length of each touch sensing electrode 12 along the first direction may be in a range from about 3 mm to about 6 mm.

As shown in FIG. 2, each touch driving electrode 13 has two opposite sides along the second direction. One common electrode 15 and one row of the touch sensing electrodes 12 are arranged at each side of the touch driving electrodes 13; wherein each touch driving electrode 13 is between two adjacent common electrodes 15. Each common electrode 15 is between one adjacent touch driving electrode 13 and one adjacent row of the touch sensing electrodes 12. As shown in FIG. 2, the touch driving electrodes 13, the touch sensing electrodes 12, and the common electrodes 15 cooperatively define a plurality of basic units 103 in the display area 101. Each basic unit 103 includes one touch driving electrode 13, and two common electrodes 15, and two rows of the touch sensing electrodes 12 at opposite sides of the one touch driving electrode 13. The plurality of basic units 103 are periodically and repeatedly arranged along the second direction.

As shown in FIG. 2, the TFT substrate 10 further includes a plurality of sensing lines 113. The sensing lines 113 are formed by a conductive layer which is different from the conductive material layer 110. It is understood that an insulating material layer (not shown) is between the conductive material layer 110 and the conductive layer. In the present exemplary embodiment, the sensing lines 113 are formed on a side of the conductive material layer 110 facing the color filter substrate 60. Each sensing line 113 connects to and is located between two adjacent touch sensing electrodes 12 in a same column of the touch sensing electrodes 12, and each sensing line 113 is electrically insulated from the touch drive electrodes 13 and the common electrodes 15. In a same column of the touch sensing electrodes 12, every two adjacent touch sensing electrodes 12 are electrically coupled by at least one sensing line 113. Each sensing line 113 is connected to the corresponding touch sensing electrode 12 by a via hole 18 extending through the insulating material layer. Each sensing line 113 extends along a second direction. The touch sensitive electrodes 12 in a same column are electrically connected by the sensing lines 113, and the touch sensitive electrodes 12 in different columns are insulated from each other. The sensing lines 113 connecting between two touch sensing electrodes 12 at opposite sides of each touch driving electrode 13 cross one touch driving electrode 13 and the two common electrodes 15.

In the present exemplary embodiment, every two adjacent touch sensing electrodes 12 in a same column are electrically connected by four sensing lines 113 parallel to each other, and the four parallel sensing lines 113 are spaced apart from each other along the first direction.

As shown in FIG. 2, the plurality of touch driving electrodes 13, the plurality of touch sensing electrodes 12, the plurality of common electrodes 15, and the plurality of sensing lines 113 cooperatively form a plurality of touch sensing units 20 (shown within a broken line box). The plurality of touch sensing units 20 is arranged in a matrix formed by a plurality of rows and a plurality of columns. Each row of the touch line sensing units 20 along the first direction forms one basic unit 103. Each touch sensing unit 20 includes two touch sensing electrodes 12 located in a same column along the second direction, a portion of a touch driving electrode 13 located between the two touch sensing electrodes 15, a portion of the two common electrodes 15 between the two touch sensing electrodes 12, and the sensing lines 113 connected between the two touch sensing electrodes 12.

As shown in FIG. 2, the conductive material layer 110 further forms two connecting electrodes 14 (schematically shown) in the non-display area 102. The two connection electrodes 14 are on opposite sides (left and right sides) of the display area 101 along the first direction. Each connecting electrode 14 extends into a strip along the second direction.

As shown in FIG. 2, at least one driving controller 30 (schematically shown) is also provided in the non-display area 102 of the touch display panel 100. In the present exemplary embodiment, there are two driving controllers 30. Each driving controller 30 is located on a side of one connection electrode 14 away from the display area 101 and each connection electrode 14 is located between one driving controller 30 and the display area 101. The driving controller 30 is configured to transmit touch driving signals.

The connecting electrode 14 is electrically coupled to each common electrode 15 by a wire 115. Opposite ends of each common electrode 15 along the first direction are electrically coupled to one connecting electrodes 14 so that the plurality of common electrodes 15 is electrically connected in parallel between the two connection electrodes 14, to reduce the overall resistance. Each touch driving electrode 13 is electrically coupled to the driving controller 30 by a wire 114.

The touch driving electrodes 13 and the touch sensing electrodes 12 also function as common electrodes. The touch display panel 100 is driven by a time division driving method. During display period, display driving signals (such as common electrode voltage) are applied to the touch driving electrodes 13, the touch sensing electrodes 12, and the common electrodes 15. During touch sensing period, the driving controller 30 sends touch driving signals to the touch driving electrodes 13. The touch driving signal may be a sine wave, a square wave, or a triangular wave.

As shown in FIG. 2, a read circuit 50 (schematically shown) is also provided in the non-display area 102 of the touch display panel 100. The read circuit 50 is on a side of the display area 101 along the second direction. In the present exemplary embodiment, the read circuit 50 is on a lower side of the display area 101. The touch sensing electrodes 12 in a same column are electrically connected by a plurality of sensing lines 113, and the sensing lines 113 in a same column of the touch sensing electrodes 12 adjacent to the read circuit 50 are electrically connected to the read circuit 50. Thereby, each column of the touch sensing electrodes 12 is electrically connected to the read circuit 50. The read circuit 50 is configured to receive the touch sensing signals from the touch sensing electrodes 12.

In each touch sensing unit 20, the touch driving electrode 13 and each of the two touch sensing electrodes 12 in the touch sensing unit 20 form a first capacitor. The touch driving electrode 13 and the touch sensing electrode 12 in one adjacent touch sensing unit 20 along the second direction form a second capacitor and the touch driving electrode 13 and each sensing line 113 in the touch sensing unit 20 form a parasitic capacitor.

The capacitance C of each touch sensing unit 20 can be calculated by the following formula:

$$C = 2 \times C_1 + N \times C_2 + M \times C_3 + C_{other}$$

Wherein $C_1$ is the capacitance of the first capacitor, $C_2$ is the capacitance of the second capacitor, $C_3$ is the capacitance of the parasitic capacitor, M is the number of the sensing lines 113 in each touch sensing unit 20, N is equal to 1 or 2, and $C_{other}$ is capacitance of the capacitor formed by the touch driving electrode 13 and the other conductive layer. As described above, since in each touch sensing unit 20 the touch drive electrode 13 and the two touch sensing electrodes 12 each form a first capacitor, each touch sensing element 20 has two capacitors. When the touch sensing unit 20 is in a first row or a last row (along the first direction) of the touch sensing units 20 arranged along the second direction as shown in FIG. 2, there is only one touch sensing unit 20 adjacent to the touch sensing unit 20 along the second direction. In this case, N is equal to 1, in other cases N is equal to 2.

Second Embodiment

Figure 3:
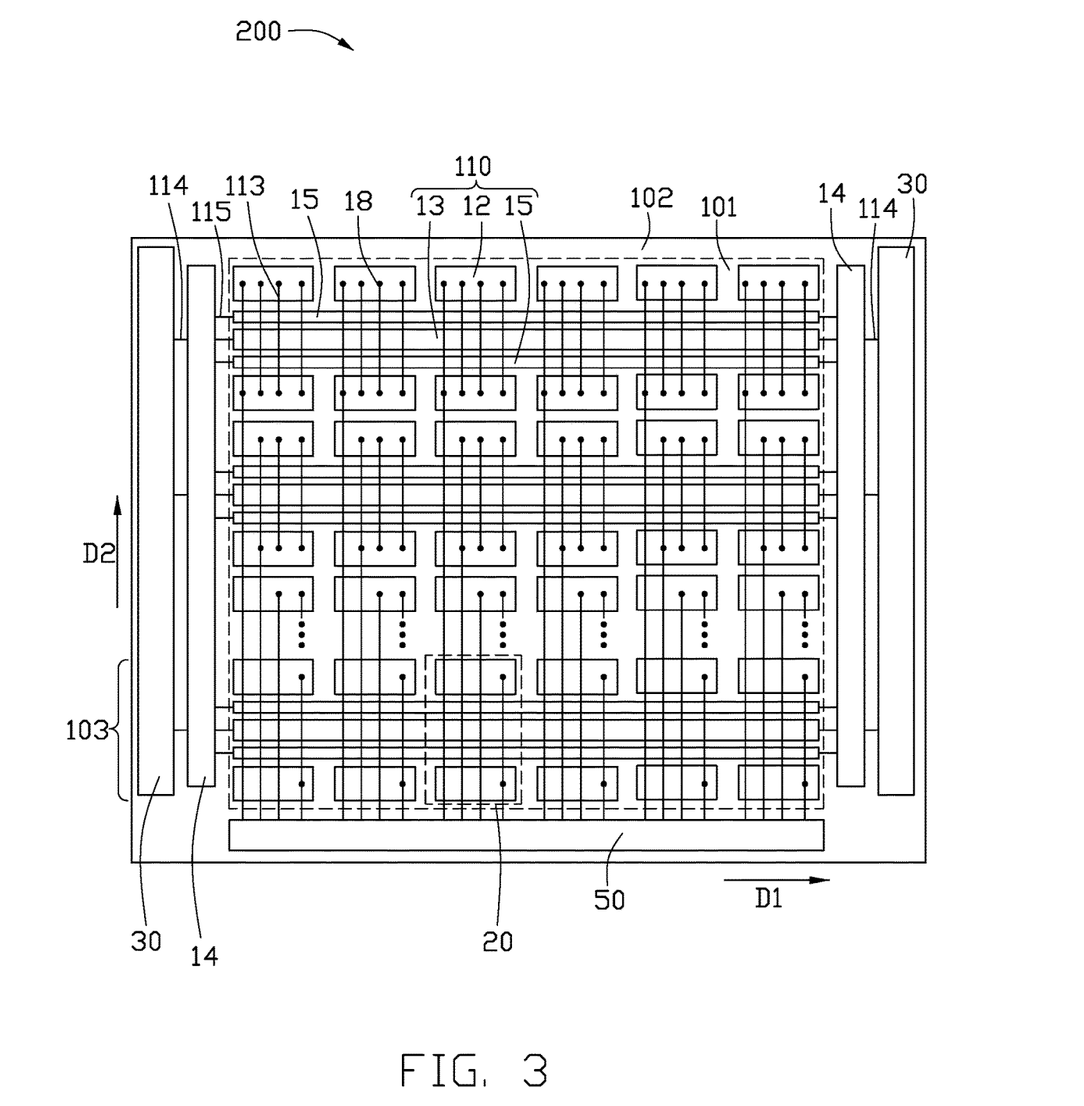
FIG. 3 is a planar view of a second exemplary embodiment of a TFT substrate.

FIG. 3 shows a TFT substrate 200 of a second embodiment. As shown in FIG. 3, the TFT substrate 200 is substantially the same as the TFT substrate 10 of the first embodiment and includes a same conductive material layer 110 (including a same arrangement of the plurality of driving electrodes 13, a plurality of touch sensing electrodes 12, and a plurality of common electrodes 15), two connecting electrodes 14, two driving controllers 30, and a read circuit 50. Differences between the TFT substrate 200 and the TFT substrate 10 of the first embodiment are an arrangement of the sensing lines 113. In the first embodiment, every two adjacent touch sensing electrodes 12 in a same column of the touch sensing electrodes 12 is electrically connected by the sensing lines 113, and each of the column touch sensing electrodes 12 is electrically connected to the read circuit 50 by the sensing lines 113. In the second exemplary embodiment, the two touch sensing electrodes 12 in each touch sensing unit 20 are electrically connected by the sensing lines 113; the touch sensing electrodes 12 of different touch sensing units 20 are not connected to each other, and each touch sensing unit 20 is connected to the read circuit 50 by a sensing line 113.

As shown in FIG. 3, in the second exemplary embodiment, the two touch sensing electrodes 12 in one touch sensing unit 20 are electrically connected by at least one sensing line 113, and one of the at least one sensing line 113 extends to being electrically connected to the read circuit 50.

Third Embodiment

Figure 4:
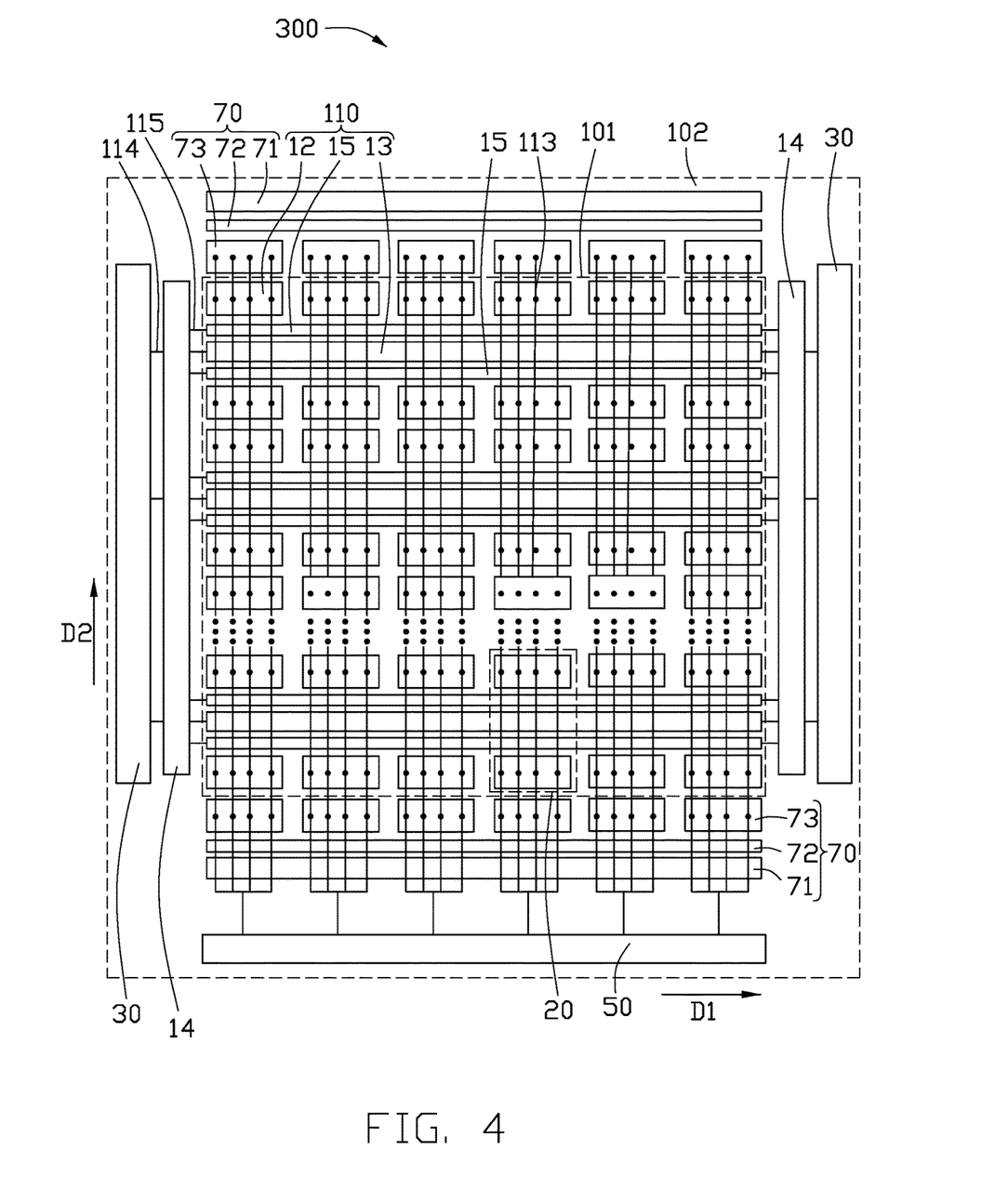
FIG. 4 is a planar view of a third exemplary embodiment of a TFT substrate.

FIG. 4 shows a TFT substrate 300 of a third embodiment. As shown in FIG. 4, the TFT substrate 300 is substantially the same as the TFT substrate 10 of the first embodiment and includes a same conductive material layer 110 (including a same arrangement of the plurality of driving electrodes 13, a plurality of touch sensing electrodes 12, and a plurality of common electrodes 15), two connecting electrodes 14, two driving controllers 30, a plurality of sensing lines 113, and a read circuit 50. Differences between the TFT substrate 300 and the TFT substrate 10 of the first embodiment is that the TFT substrate 300 further comprises two dummy units 70. In the third exemplary embodiment, the two dummy units 70 are in the non-display area, and the two dummy units 70 are symmetrically arranged on both sides (upper and lower sides) of the plurality of touch sensing units 20 along the second direction.

As shown in FIG. 4, in the third exemplary embodiment, each dummy unit 70 includes a dummy touch drive electrode 71, a dummy common electrode 72 and a row of dummy touch sensing electrodes 73 along the first direction D1. Herein, the dummy common electrode 72 is between the dummy touch driving electrode 71 and the row of dummy touch sensing electrodes 73. The row of dummy touch sensing electrodes 73 is between the dummy common electrode 72 and the row of the touch sensing electrodes 12 along the first direction D1. The dummy touch driving electrode 71 is not connected to the driving controller 30, and the dummy common electrode 72 is not connected to the two connecting electrodes 14. Each dummy touch sensing electrode 73 is electrically connected to the touch sensing electrode 12 adjacent to the dummy touch sensing electrode 73 along the second direction by the sensing lines 113. The dummy unit 70 is configured to compensate for the capacitance at the upper and lower edges of the display area 101 so that the capacitance of the entire display area 101 is evenly distributed.

Figure 5:
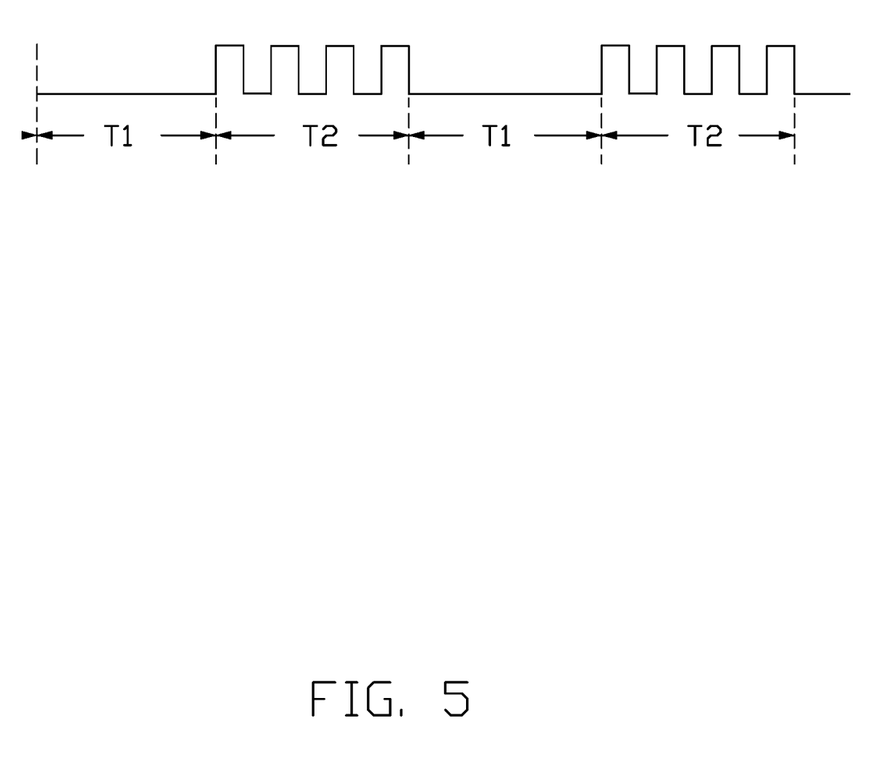
FIG. 5 is a diagrammatic view of drive-time sequence in relation to each of the plurality of the touch driving electrodes of FIG. 2 through FIG. 4.

FIG. 5 shows a driving timing diagram of the touch driving electrodes 13 applicable to any of the above-described three embodiments. During a display period T1, a direct current voltage (common electrode voltage) is applied to the touch driving electrode 13. During a touch sensing period T2, a touch drive signal (pulse signal voltage) is applied to the touch driving electrode 13.

The touch driving electrodes 13, the touch sensing electrodes 12, and the common electrodes 15 are defined by the same conductive material layer 110, thus thickness the TFT substrate of the above embodiments can be effectively reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A TFT substrate defining a display area and a non-display area surrounding the display area of a touch display panel, the TFT substrate comprising:
 a base substrate; and
 a conductive material layer on the base substrate, the conductive material layer comprising a plurality of touch driving electrodes spaced apart from each other, a plurality of touch sensing electrodes spaced apart from each other, and a plurality of common electrodes spaced apart from each other, each of the plurality of common electrodes being independent from the plurality of touch driving electrodes and the plurality of touch sensing electrodes;
 wherein the plurality of touch sensing electrodes are arranged in a plurality of rows along a first direction and in a plurality of columns along a second direction; wherein the first direction intersects the second direction; wherein each of the plurality of touch driving electrodes and each of the plurality of common electrodes extend to be strips along the first direction; wherein the plurality of touch driving electrodes and the plurality of common electrodes are arranged in one column along the second direction; wherein one of the plurality of common electrodes and one row of the touch sensing electrodes are arranged at each of opposite sides of each of the plurality of touch driving electrodes along the second direction; wherein the TFT substrate further comprises a plurality of sensing lines; each of the a plurality of sense lines is electrically coupled to two touch sensing electrodes arranged on opposite sides of one touch driving electrode and in a same column of the touch sensing electrodes;

wherein the conductive material layer forms a plurality of basic units in the display area, each of the plurality of basic units comprises one touch driving electrode, and two common electrodes and two rows of the touch sensing electrodes at opposite sides of the one touch driving electrode, the plurality of basic units are periodically arranged along the second direction;

wherein in each of the plurality of basic units, one touch driving electrode and two common electrodes are between two rows of the touch sensing electrodes;

wherein the touch display panel includes a display period and a touch sensing period; the common electrodes cooperate with pixel electrodes to drive the display function;

wherein the touch driving electrodes and the touch sensing electrodes also function as common electrodes during the display period, so that during the display period, display driving signals are applied to the touch driving electrodes, the touch sensing electrodes and the common electrodes for the display function, and during the touch sensing period, touch driving signals are sent to the touch driving electrodes and touch signals are received from the sensing electrodes for touch sensing.

2. The TFT substrate according to claim 1, wherein the plurality of touch driving electrodes, the plurality of touch sensing electrodes, the plurality of common electrodes, and the plurality of sensing lines cooperatively form a plurality of touch sensing units; the plurality of touch sensing units are arranged in a plurality of rows and a plurality of columns; each row of the touch line sensing units along the first direction forms one of the plurality of basic units; each of the plurality of touch sensing units comprises two adjacent touch sensing electrodes in one column along the second direction, a portion of one touch driving electrode located between the two touch sensing electrodes, a portion of two common electrodes between the two touch sensing electrodes, and the sensing lines connected between the two touch sensing electrodes.

3. The TFT substrate according to claim 2, wherein every two adjacent touch sensing electrodes in one column of the touch sensing electrodes are electrically coupled by at least one of the plurality of sensing lines; each of the plurality of sensing lines is electrically insulated from the plurality of touch driving electrodes and the plurality of common electrodes.

4. The TFT substrate according to claim 3, wherein a read circuit is provided in the non-display area and configured to receive touch sensing signals from the plurality of touch sensing electrodes; each column of the touch sensing electrodes is electrically coupled to the read circuit.

5. The TFT substrate according to claim 2, wherein the two adjacent touch sensing electrodes in each of the plurality of touch sensing units are electrically coupled by at least one of the plurality of sensing lines; and touch sensing electrodes in different touch sensing units are not electrically coupled to each other.

6. The TFT substrate according to claim 5, wherein a read circuit is provided in the non-display area and configured to receive touch sensing signals from the plurality of touch sensing electrodes; each of the plurality of touch sensing units is electrically coupled to the read circuit.

7. The TFT substrate according to claim 2, wherein the TFT substrate further comprises two dummy units in the non-display area; the two dummy units are symmetrically arranged on opposite sides of the plurality of touch sensing units along the second direction; each of the dummy unit includes a dummy touch drive electrode, a dummy common electrode, and a row of dummy touch sensing electrodes along the first direction; wherein the dummy common electrode is between the dummy touch driving electrode and the row of dummy touch sensing electrodes; the row of dummy touch sensing electrodes is between the dummy common electrode and one row of the touch sensing electrodes.

8. The TFT substrate according to claim 1, wherein the conductive material layer further forms two connecting electrodes in the non-display area; the plurality of common electrodes is electrically connected in parallel between the two connection electrodes.

9. A touch display panel comprising:
a color filter substrate; and
a TFT substrate facing the color filter substrate; the TFT substrate defining a display area and a non-display area surrounding the display area, the TFT substrate comprising:
a base substrate; and
a conductive material layer on the base substrate, the conductive material layer comprising a plurality of touch driving electrodes spaced apart from each other, a plurality of touch sensing electrodes spaced apart from each other, and a plurality of common electrodes spaced apart from each other, each of the plurality of common electrodes being independent from the plurality of touch driving electrodes and the plurality of touch sensing electrodes;

wherein the plurality of touch sensing electrodes are arranged in a plurality of rows along a first direction and in a plurality of columns along a second direction; wherein the first direction intersects the second direction; wherein each of the plurality of touch driving electrodes and each of the plurality of common electrodes extend to be strips along the first direction; wherein the plurality of touch driving electrodes and the plurality of common electrodes are arranged in one column along the second direction; wherein one of the plurality of common electrodes and one row of the touch sensing electrodes are arranged at each of opposite sides of each of the plurality of touch driving electrodes along the second direction; wherein the TFT substrate further comprises a plurality of sensing lines; each of the a plurality of sense lines is electrically coupled to two touch sensing electrodes arranged on opposite sides of one touch driving electrode and in a same column of the touch sensing electrodes;

wherein the conductive material layer forms a plurality of basic units in the display area, each of the plurality of basic units comprises one touch driving electrode, and two common electrodes and two rows of the touch sensing electrodes at opposite sides of the one touch driving electrode; the plurality of basic units are periodically arranged along the second direction;

wherein in each of the plurality of basic units, one touch driving electrode and two common electrodes are between two rows of the touch sensing electrodes;

wherein the touch display panel includes a display period and a touch sensing period; the common electrodes cooperate with pixel electrodes to drive the display function;

wherein the touch driving electrodes and the touch sensing electrodes also function as common electrodes during the display period, so that during the display period, display driving signals are applied to the touch driving electrodes, the touch sensing electrodes and the common electrodes for the display function, and during the touch sensing period, touch driving signals are sent to the touch driving electrodes and touch signals are received from the sensing electrodes for touch sensing.

10. The touch display panel according to claim 9, wherein the plurality of touch driving electrodes, the plurality of touch sensing electrodes, the plurality of common electrodes, and the plurality of sensing lines cooperatively form a plurality of touch sensing units; the plurality of touch sensing units are arranged in a plurality of rows and a plurality of columns; each row of the touch line sensing units along the first direction forms one of the plurality of basic units; each of the plurality of touch sensing units comprises two adjacent touch sensing electrodes in one column along the second direction, a portion of one touch driving electrode located between the two touch sensing electrodes, a portion of two common electrodes between the two touch sensing electrodes, and the sensing lines connected between the two touch sensing electrodes.

11. The touch display panel according to claim 10, wherein every two adjacent touch sensing electrodes in one column of the touch sensing electrodes are electrically coupled by at least one of the plurality of sensing lines; each of the plurality of sensing lines is electrically insulated from the plurality of touch driving electrodes and the plurality of common electrodes.

12. The touch display panel according to claim 11, wherein a read circuit is provided in the non-display area and configured to receive touch sensing signals from the plurality of touch sensing electrodes; each column of the touch sensing electrodes is electrically coupled to the read circuit.

13. The touch display panel according to claim 10, wherein the two adjacent touch sensing electrodes in each of the plurality of touch sensing units are electrically coupled by at least one of the plurality of sensing lines; and touch sensing electrodes in different touch sensing units are not electrically coupled to each other.

14. The touch display panel according to claim 13, wherein a read circuit is provided in the non-display area and configured to receive touch sensing signals from the plurality of touch sensing electrodes; each of the plurality of touch sensing units is electrically coupled to the read circuit.

15. The touch display panel according to claim 10, wherein the TFT substrate further comprises two dummy units in the non-display area; the two dummy units are symmetrically arranged on opposite sides of the plurality of touch sensing units along the second direction; each of the dummy unit includes a dummy touch drive electrode, a dummy common electrode, and a row of dummy touch sensing electrodes along the first direction; wherein the dummy common electrode is between the dummy touch driving electrode and the row of dummy touch sensing electrodes; the row of dummy touch sensing electrodes is between the dummy common electrode and one row of the touch sensing electrodes.

16. The touch display panel according to claim 9, wherein the conductive material layer further forms two connecting electrodes in the non-display area; the plurality of common electrodes is electrically connected in parallel between the two connection electrodes.

* * * * *